(12) United States Patent
Fukushima et al.

(10) Patent No.: US 10,040,116 B2
(45) Date of Patent: Aug. 7, 2018

(54) METHOD OF MANUFACTURING CERAMIC SINTERED BODY AND CERAMIC SINTERED BODY

(71) Applicant: HITACHI METALS, LTD., Tokyo (JP)

(72) Inventors: Hideko Fukushima, Shimane (JP); Masayoshi Date, Shimane (JP); Tsuyoshi Yamamoto, Shimane (JP); Shuhei Iwagaki, Shimane (JP)

(73) Assignee: HITACHI METALS, LTD., Tokyo (JP)

( * ) Notice: Subject to any disclaimer, the term of this patent is extended or adjusted under 35 U.S.C. 154(b) by 202 days.

(21) Appl. No.: 14/907,762

(22) PCT Filed: Feb. 12, 2015

(86) PCT No.: PCT/JP2015/053791
§ 371 (c)(1),
(2) Date: Jan. 26, 2016

(87) PCT Pub. No.: WO2015/122445
PCT Pub. Date: Aug. 20, 2015

(65) Prior Publication Data
US 2016/0167118 A1 Jun. 16, 2016

(30) Foreign Application Priority Data

Feb. 13, 2014 (JP) .................................. 2014-025101
Mar. 28, 2014 (JP) .................................. 2014-068548

(51) Int. Cl.
B22C 9/02 (2006.01)
B22C 9/04 (2006.01)
(Continued)

(52) U.S. Cl.
CPC .................. *B22C 9/24* (2013.01); *B22C 9/02* (2013.01); *B22C 9/04* (2013.01); *B22C 9/10* (2013.01);
(Continued)

(58) Field of Classification Search
CPC .... B22C 9/02; B22C 9/04; B22C 9/10; B22C 9/24
(Continued)

(56) References Cited

U.S. PATENT DOCUMENTS 6,274,079 B1  8/2001  Lindermann et al.
6,626,230 B1  9/2003  Woodrum
(Continued)

FOREIGN PATENT DOCUMENTS

JP  05185181  7/1993
JP  07009085  1/1995
(Continued)

OTHER PUBLICATIONS

International Search Report dated May 19, 2015 filed in PCT/JP2015/053791.
(Continued)

*Primary Examiner* — Kevin P Kerns
(74) *Attorney, Agent, or Firm* — Rankin, Hill & Clark LLP

(57) ABSTRACT

There is provided a manufacturing method including: forming a molded body element with a molding material containing a ceramic powder and a binder; forming a ceramic molded body by disposing at least one molded body element in a mold and then injecting a molding material containing a ceramic powder and a binder into the mold and graft molding a graft molded body element to the molded body element; and forming a ceramic sintered body by degreasing and sintering the ceramic molded body. A graft connecting (Continued)

surface of the molded body element to which the graft molded body element is graft molded is formed so as to have a surface roughness of 2 μm or more in terms of Ra.

4 Claims, 9 Drawing Sheets

(51) Int. Cl.
*B22C 9/10* (2006.01)
*B22C 9/24* (2006.01)
*C04B 35/626* (2006.01)
*C04B 35/638* (2006.01)
*B28B 1/24* (2006.01)
*B28B 19/00* (2006.01)

(52) U.S. Cl.
CPC ............... *B28B 1/24* (2013.01); *B28B 19/00* (2013.01); *C04B 35/62665* (2013.01); *C04B 35/638* (2013.01); *C04B 2235/3201* (2013.01); *C04B 2235/3217* (2013.01); *C04B 2235/3248* (2013.01); *C04B 2235/3418* (2013.01); *C04B 2235/5472* (2013.01); *C04B 2235/6022* (2013.01); *C04B 2235/963* (2013.01)

(58) Field of Classification Search
USPC ............................................ 164/369, 15, 45
See application file for complete search history.

(56) References Cited

U.S. PATENT DOCUMENTS

2002/0094410 A1 7/2002 Beyerer
2015/0321247 A1 11/2015 Fukushima

FOREIGN PATENT DOCUMENTS

| | | |
|---|---|---|
| JP | 10230344 | 9/1998 |
| JP | 11-171660 | 6/1999 |
| JP | 2000274238 A2 | 10/2000 |
| JP | 2001232445 A2 | 8/2001 |
| JP | 2003500212 T2 | 1/2003 |
| JP | 2003-048783 | 2/2003 |
| JP | 2004504945 T2 | 2/2004 |
| JP | 3802095 B2 | 7/2006 |
| WO | 2013018393 A1 | 2/2013 |

OTHER PUBLICATIONS

Extended European Search Report dated Oct. 2, 2017 for the corresponding European Patent Application No. 15748444.5.

(a)

(b)

(a)

(b)

(a)

(b)

(a)

(b)

METHOD OF MANUFACTURING CERAMIC SINTERED BODY AND CERAMIC SINTERED BODY

TECHNICAL FIELD

The present invention relates to a ceramic sintered body used for producing a cast having a hollow structure, and a method of manufacturing the ceramic sintered body.

BACKGROUND ART

A cast having a hollow structure is used in various fields. For example, cooling holes provided to a turbine blade of a gas turbine are known to have a hollow structure that is especially complex in shape and is required to have high dimensional accuracy. A certain turbine blade includes cooling holes in an area covering from a dovetail portion (a joint portion) to a blade portion. Also, a big turbine blade further includes a shank portion (a body portion). Cooling holes are provided from the dovetail portion to the blade portion through the shank portion. The lost wax precision casting or the like is applied for such a cast having such a hollow structure. Such a big turbine blade can be manufactured by using, as a core, a ceramic sintered body having a shape corresponding to the hollow structure.

FIG. 1 illustrates a ceramic sintered body (a ceramic core 1) having a shape corresponding to cooling holes provided to an area covering from a dovetail portion (a joint portion) to a blade portion of a turbine blade, as an example of a ceramic sintered body used for producing a cast having a hollow structure. This ceramic core 1 roughly includes a blade portion 2 and a dovetail portion 3 both jointed through a platform portion 4. The blade portion 2 has a pin fin portion 5 that is particularly thin-walled. Other than this pin fin portion 5, there are many portions having a shape containing a curved surface or a curve and a tapered thickness. It is noted that when the cast having a hollow structure is a turbine blade having a shank portion, a ceramic core having a shape corresponding to the shank portion can be used.

There is disclosed a technology in which a ceramic sintered body having a shape corresponding to a complex hollow structure including such cooling holes of a turbine blade is formed by connecting and integrating a plurality of pieces. For example, Japanese Patent No. 3802095 (Patent Literature 1) discloses a ceramic sintered body used when a cast is a hollow blade including a rear edge portion and a body portion of a gas-cooled gas engine turbine. A first core portion corresponding to the rear edge portion and a second core portion corresponding to the body portion of the blade of this ceramic sintered body are connected to each other and integrated. A tongue-like element is disposed to one of the first core portion and the second core portion, and a groove-like element is disposed to the other of the first core portion and the second core portion. These elements are mated with each other so that the core portions are connected (for example, FIG. 2 of Patent Literature 1). Further, it is disclosed that when the first core portion and the second core portion have substantially equal thermal properties, a heated thermoplastic binder can be used as an adhesive, instead of disposing the above-described mating elements, so that the core portions are connected to each other (for example, claim 15 of Patent Literature 1). The first core portion and the second core portion connected in this manner are sintered in a state where they are integrated, so that a ceramic sintered body is formed.

In addition, Patent Literature 1 (for example, claim 15) discloses a technology (hereinafter, referred to as an "insert molding process") in which the integrated ceramic molded body is formed by: placing in an injection molding mold a first core portion having one mating element (for example, a tongue-like element) on a connecting surface; and injecting a ceramic material corresponding to a second core portion into the residual portion in the mold. According to such an insert molding process, the subsequently injection-molded second core portion can be connected to the first core portion at the location of the mating elements in a state where spaces are eliminated. Therefore, it is considered that in the ceramic molded body before sintering or the ceramic sintered body after sintering including the first core portion and the second core portion in an integrated manner, separation and deviation in relative position between the first core portion and the second core portion are unlikely to be caused.

CITATION LIST

Patent Literature

PATENT LITERATURE 1: Japanese Patent No. 3802095

SUMMARY OF THE INVENTION

Problems to be Solved by the Invention

The present inventors reviewed on application of the insert molding process disclosed in Patent Literature 1 for forming a ceramic sintered body (a ceramic core 1) having a shape illustrated in FIG. 1, when manufacturing a casting blade for a gas turbine (a turbine blade) including a complex hollow structure (cooling holes) inside the turbine blade.

Specifically, when a ceramic core having the shape illustrated in FIG. 1 was formed by dividing the ceramic core into a plurality of pieces, a pin fin portion 15 of a blade portion 12 was separated along connecting surfaces 11a, 11b, 11c, and 11d (a connecting portion 11) by considering the pin fin portion 15 as a piece (hereinafter, referred to as a "pin fin portion core 16") equivalent to the first core portion of Patent Literature 1, as indicated by a ceramic molded body 10 illustrated in FIG. 2. The residual portion including the blade portion 12 excluding the pin fin portion 15, a dovetail portion 13, and a platform portion 14 was considered as a portion equivalent to the second core portion of Patent Literature 1 (hereinafter, referred to as a "body portion core 17").

The pin fin portion core 16 was formed by injecting a molding material containing a ceramic powder and a binder into an injection molding mold provided with a cavity corresponding to the shape of the pin fin portion core 16. At that time, a tongue-like convex portion 16a was formed as a mating element on the connecting surface 11a of the pin fin portion core 16 (indicated by hatched lines in FIG. 3) to which the body portion core 17 as the residual portion is to be connected, as illustrated in FIG. 3. Further, although not illustrated, a similar tongue-like convex portion (hereinafter, referred to as a "convex portion" for convenience) was also formed on the connecting surface 11b. Further, as illustrated in FIG. 4, a hemispherical convex portion 16c was formed on the connecting surface 11c of the pin fin portion core 16 (indicated by hatched lines in FIG. 4). Further, although not illustrated, a similar hemispherical convex portion (hereinafter, referred to as a "convex portion 16d" for convenience) was also formed on the connecting surface 11d.

By the structure employing these mating elements, the convex portion 16a of the pin fin portion core 16 and a concave portion 17a of the body portion core 17 are mated with each other on the connecting surface 11a (the connecting portion 11) for integration. Similarly, the convex portion and a concave portion are mated with each other on the connecting surfaces 11b, and the convex portion 16c and a concave portion 17c, and the convex portion 16d and a concave portion 17d are mated with each other on the connecting surfaces 11c, and 11d (the connecting portion 11) respectively for integration. It is noted that an entire surface of the pin fin portion core 16 including the connecting surfaces 11a, 11b, 11c, and 11d is formed by transfer of the cavity surface of the mold. Therefore, the surface roughness was 1 μm or less in terms of Ra, which is standard for an injection molding mold.

Further, the body portion core 17 as the residual portion of the ceramic molded body 10 was formed by disposing the pin fin portion core 16 in a predetermined position in an injection molding mold and thereafter performing insert-molding with the same molding material as the pin fin portion core 16. That is, the body portion core 17 (a product formed by injecting a molding material into an injection molding mold in which a molded body element has been disposed, hereinafter referred to as a "graft molded body element") was insert molded (hereinafter, insert molding the graft molded body element to the molded body element is also referred to as "graft molding") to the pin fin portion core 16 (a product disposed inside the injection molding mold, hereinafter also referred to as a "molded body element), thereby to form the ceramic molded body 10 having a shape corresponding to the ceramic core 1 illustrated in FIG. 1. This ceramic molded body 10 has a structure in which the convex portion 16a of the pin fin portion core 16 and the concave portion 17a of the body portion core 17, and similarly, the convex portion 16c and the concave portion 17c, are mated with each other to be connected.

Subsequently, the ceramic molded body 10 formed as described above was degreased and sintered in an appropriate treatment condition thereby to form a ceramic sintered body, that is, a ceramic core.

One of the problems associated with this degreasing and sintering process is cracking and breaking that are caused in the degreased body in a state where the binder has been removed from the ceramic molded body 10 to a degree that allows for handling. A form of cracking which is nearly breaking is schematically illustrated in FIG. 5. It was confirmed that breaking 18 caused in this degreased body started from an end portion 11e and its vicinity of a connecting portion (the connecting surface 11a), indicated by dotted lines in FIG. 5, between the pin fin portion core 16 and the body portion core 17. Other than this example, there were deficiencies such as cracking that does not lead to breaking in the degreased body after similar sintering, and cracking in the ceramic sintered body after degreasing and sintering, in some cases. Such breaking and cracking of the degreased body and the sintered body generally started from the connecting surface and its end portion between the molded body element and the graft molded body element.

Another problem associated with the degreasing and sintering process is poor adhesion of the connecting surfaces 11c and 11d which have a significantly smaller connecting surface area than the connecting surfaces 11a and 11b. The connecting surfaces 11c and 11d appeared to be fixed and integrated in the ceramic molded body 10 that had been left to stand for a sufficient period after insert molding. However, in forced fracture by bending at normal temperature performed with randomly selected several ceramic molded bodies 10, a fracture form was observed in which the pin fin portion core 16 and the body portion core 17 were peeled from each other on the connecting surfaces 11c and 11d. Therefore, it was confirmed that a poor connection, which is considered to be failure of adhesion, was caused particularly on the connecting surfaces 11c and 11d each having a smaller connecting surface area in the ceramic molded body 10 formed as described above.

An object of the present invention is to apply the conventional insert molding process to solve the problem of breaking and cracking starting from the connecting surface between the above-described molded body element and graft molded body element and to solve the problem related to a poor connection that is considered to be failure of adhesion on the connecting surface, thereby to provide a method of manufacturing a ceramic sintered body and the ceramic sintered body which has a complex shape and does not cause breaking and cracking and which is applicable as a ceramic core used for producing a cast having a complex hollow structure such as a turbine blade including cooling holes inside the turbine blade.

Solutions to the Problems

The present inventors conducted researches on a ceramic sintered body in which a connecting surface between a molded body element and a graft molded body element was not substantially exposed when the sintered body was subjected to forced fracture by bending at normal temperature. As a result, it was found that a coarsened connecting surface of the molded body element to be connected with the graft molded body element increases mechanical strength (connection strength), and that previously increasing the temperature of the molded body element in addition to the coarsening further increases mechanical strength (connection strength). Thus, the present inventors have arrived at the present invention.

A method of manufacturing a ceramic sintered body includes: forming a molded body element with a molding material containing a ceramic powder and a binder; forming a ceramic molded body by disposing the at least one molded body element in an injection molding mold and then injecting a molding material containing a ceramic powder and a binder into a space within the injection molding mold and graft molding a graft molded body element to the molded body element; and forming the ceramic sintered body by degreasing and sintering the ceramic molded body. A graft connecting surface of the molded body element to which the graft molded body element is graft molded is formed so as to have a surface roughness of 2 μm or more in terms of Ra.

Moreover, it is preferable that the molded body element be previously increased in temperature to 5° C. or more lower than a melting point of the binder contained in the molded body element before the graft molded body element is graft molded.

More preferably, the temperature of the molded body element is previously increased to 32° C. or higher. In brief, the temperature of the molded body element is previously increased to the temperature range from 32° C. to 5° C. or more lower than the melting point of the binder contained in the molded body element.

The method of manufacturing the ceramic sintered body according to the present invention can be applied to the method of manufacturing a ceramic core that is used for producing a turbine blade having a hollow structure and has a shape corresponding to the hollow structure of the turbine blade.

In this case, at least part of the molded body element is preferably formed so as to have a shape corresponding to the hollow structure of a blade portion of the turbine blade.

By the above-described method of manufacturing the ceramic sintered body according to the present invention, there can be formed a ceramic sintered body used for producing a cast having a complex hollow structure, like a turbine blade having cooling holes inside the turbine blade.

That is, a ceramic sintered body according to the present invention is obtained by degreasing and sintering a ceramic molded body including: at least one molded body element formed with a molding material containing a ceramic powder and a binder; and a graft molded body element that is graft molded to the molded body element. A forced fracture form by bending at normal temperature (25° C.) is a fracture form that is not attributable to a graft connecting surface between the molded body element and the graft molded body element.

Further, the at least one molded body element preferably includes part of an outer circumference of a predetermined shape of the ceramic molded body.

The ceramic sintered body according to the present invention can be applied to a ceramic core that is used for producing a turbine blade having a hollow structure and has a shape corresponding to the hollow structure of the turbine blade. Further, at least part of the molded body element preferably corresponds to a shape corresponding to the hollow structure of a blade portion of the turbine blade.

Here, the "graft" has a meaning of an "object to graft", an "object to be grafted", or a "build-up object". As described herein, a "graft molded body element" intends to a molded body element that is newly formed to be connected to one or more previously formed molded body elements. Further, "graft molding" as described herein intends to an injection molding process of disposing one or more molded body elements inside a cavity of an injection molding mold and thereafter injecting a molding material thereby to add a new molded body element (a graft molded body element) to the existing molded body elements in the cavity.

Effects of the Invention

According to the present invention, there can be obtained the ceramic sintered body that has a complex shape and does not cause breaking, cracking, and a poor connection particularly on the above-described graft connecting surface. Therefore, there can be obtained the ceramic sintered body having a shape corresponding to a complex hollow structure of a cast by applying the present invention. Furthermore, by using this ceramic sintered body as a ceramic core, a convex-like defect attributable to the breaking and cracking of the ceramic core can be suppressed, when producing a cast having a complex hollow structure such as a turbine blade including cooling holes inside the turbine blade.

DESCRIPTION OF THE EMBODIMENTS

Figure 1:
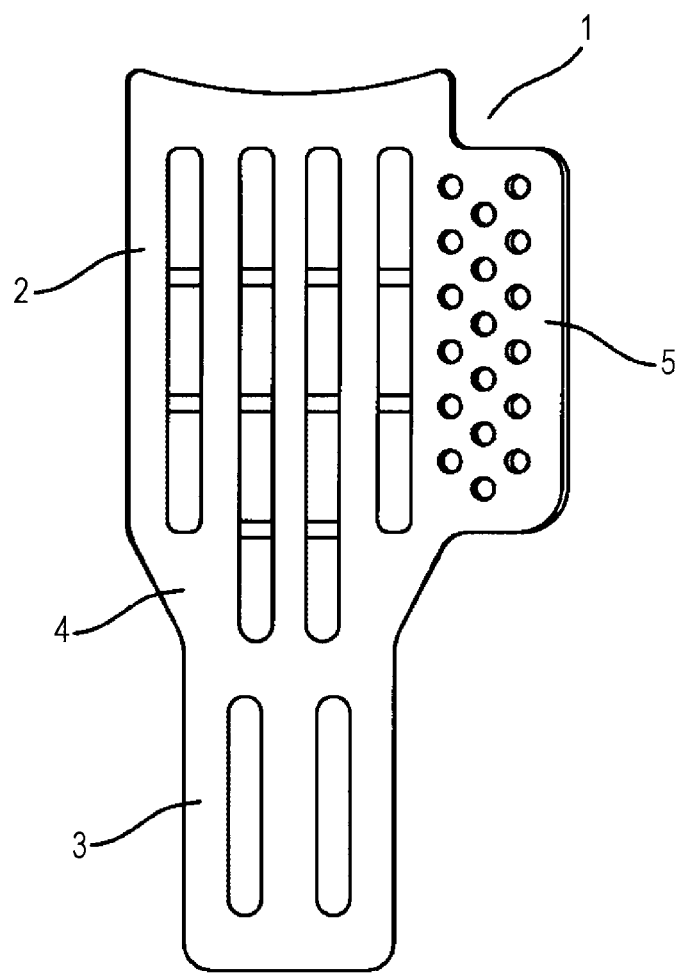
FIG. 1 is a view schematically illustrating an example (an appearance) of a ceramic core.

First, a method of manufacturing a ceramic sintered body according to the present invention will be described.

A method of manufacturing a ceramic sintered body according to the present invention includes: forming a molded body element with a molding material containing a ceramic powder and a binder; forming a ceramic molded body by disposing the at least one molded body element in an injection molding mold and then injecting a molding material containing a ceramic powder and a binder into a space within the injection molding mold and graft molding a graft molded body element to the molded body element; and forming the ceramic sintered body by degreasing and sintering the ceramic molded body.

An important feature of the above-described method of manufacturing the ceramic sintered body is that when the graft molded body element is graft molded to the at least one molded body element, the graft connecting surface of the molded body element to which the graft molded body element is to be graft molded is formed so as to have a surface roughness of 2 μm or more in terms of Ra. In brief, the connecting surface on the existing molded body element side, that is, the graft connecting surface on which the graft molded body element is to be graft molded, is coarsened. Specifically, the graft connecting surface is formed so as to have a surface roughness of 2 μm or more in terms of Ra.

This coarsening of the graft connecting surface can increase a substantial surface area, which contributes to connection of the graft molded body element to the molded body element, by its coarsened degree. Further, the connection strength of the graft molded body element to the molded body element can be increased by the increment of the surface area of its connecting surface. Accordingly, the connecting surface between the molded body element and the graft molded body element and the connection structure of its end portion are strengthened. As a result, the breaking and cracking starting from the connecting surface and its end portion of the degreased body and the sintered body, which have been a problem in the known insert molding process, can be suppressed.

(Molded Body Element Forming Process)

In the method of manufacturing the ceramic sintered body according to the present invention, the "process of forming a molded body with a molding material containing a ceramic powder and a binder" described above may be considered to be equivalent to a process of forming a ceramic molded body by applying a known injection molding. Specifically, such a process includes preparing a predetermined ceramic powder and binder material suitable for each of molded body elements to be injection molded and thereafter mixing the prepared ceramic powder and binder material to obtain a molding material for injection molding. The process further includes preparing an individual injection molding mold including a cavity having a shape corresponding to each of the molded body elements and thereafter injecting (infusing) the predetermined molding material, which was heated to be suitably softened, into the cavity, and subsequently removing the molded body solidified in the mold to obtain each of the molded body elements.

Here, it is important that the graft connecting surface, which contributes to connection with the graft molded body element, is formed so as to have a larger surface area. For this purpose, the graft connecting surface of the molded body element is formed so as to have a surface roughness of 2 μm or more in terms of Ra. It is noted that according to the technological idea of the present invention, it is considered that the upper limit value of the surface roughness of the graft connecting surface does not need to be defined. However, in practical terms, this surface roughness is preferably equal to the average particle diameter (in general, represented by median diameter d50) of the ceramic powder used in the molding material. At this time, air bubbles can be sufficiently inhibited from being retained in the graft connecting surface during graft molding. Further, an example of a simple and preferred method for forming the graft connecting surface of the molded body element having a surface roughness of 2 μm or more in terms of Ra includes a method of grinding a molded skin of an injection molded body with an appropriate sandpaper or abrasive. Another example may include a method of previously forming a surface corresponding to the graft connecting surface in the cavity of the injection molding mold so as to have a predetermined surface roughness in consideration of transfer to a molded skin.

Furthermore, in order to further strengthen the connection between the molded body element and the graft molded body element, a convex portion or a concave portion is preferably provided as a mating element in a conventional manner. An applicable example of a method of forming the mating element includes a method of machining a portion corresponding to the graft connecting surface of the injection molded body into a predetermined convex or concave shape. Another applicable example includes a method of previously forming a portion corresponding to the graft connecting surface in the cavity of the injection molding mold into a predetermined convex or concave shape. This method does not require machining of each injection molded body, and therefore is preferable.

(Ceramic Molded Body Forming Process)

In the method of manufacturing the ceramic sintered body according to the present invention, the "disposing the at least one molded body element in an injection molding mold, and then injecting a molding material containing a ceramic powder and a binder into a space within the injection molding mold and graft molding a graft molded body element to the molded body element" includes a process of preparing a predetermined ceramic powder and binder material and thereafter mixing the prepared ceramic powder and binder material to obtain a molding material for injection molding, similarly to the above-described process of forming the molded body element. Furthermore, there is included a process of preparing an injection molding mold including a cavity having a shape corresponding to the ceramic molded body and thereafter injecting into the cavity the molding material having been heated to be suitably softened, and subsequently removing the molded body solidified in the mold to obtain a ceramic molded body. At this time, a completed molded body element is disposed in a predetermined position within the cavity, and thereafter the molding material is injected (infused) into the residual space of the cavity. The injected material is left to stand for solidification, and then the ceramic molded body is removed. By performing such graft molding, a graft molded body element is newly connected to the completed molded body element for integration, thereby obtain a ceramic molded body having a predetermined shape.

In this ceramic molded body forming process, the graft connecting surface of the above-described molded body element is formed so as to have a surface roughness of 2 μm or more in terms of Ra. Furthermore, the temperature of the molded body element is preferably previously increased to 5° C. or more lower than the melting point of the binder contained in the molded body element disposed in the cavity before the graft molded body element is graft molded. It is noted that, for example, when enclosure molding described later is performed or when the area of the graft connecting surface is relatively large, graft connection without poor connections can be sometimes achieved merely by increasing the temperature of the molded body element without coarsening the graft connecting surface. However, in order to enhance the stability and reliability of graft connection, the temperature of the molded body element is preferably increased before graft molding.

When the temperature of the completed molded body element disposed in the cavity is previously increased, the binder contained in the molded body element is liquefied or softened compared to at normal temperature. This reduces a difference in temperature from the binder contained in the molding material to be graft molded. Accordingly, adhesiveness between the binder contained in the molded body element (hereinafter, sometimes described as merely the "binder of the molded body element" for simplicity) and the binder contained in the molding material to be graft molded (hereinafter, sometimes described as merely the "binder of the molding material" for simplicity) increases. Thus, the connection structure of the connecting surface between the molded body element and the graft molded body element and the connection structure of its end portion are further strengthened by the increment in adhesiveness. This can increase the connection strength. Therefore, the possibility of occurrence of poor connections on the connecting surface in the degreased body and the sintered body, which has been a problem in the known insert molding, can be further reduced. It is noted that as described herein, normal temperature means 20° C. to 25° C., unless otherwise specified.

As described above, when the temperature of the molded body element is previously increased, the binder in the molded body element swells, possibly causing deformation of the molded body element. Especially, when the temperature of the molded body element is increased to the temperature exceeding 5° C. lower than the melting point of the binder, that is, the temperature exceeding "melting point of binder—5"° C., the binder of the molded body element is softened, thereby increasing its fluidity. For this reason, the shape retention properties of the molded body element are sometimes damaged. For example, in the case of enclosure molding described later which has less influence on the shape precision of the ceramic molded body even when the molded body element is thermally swollen and deformed, the temperature of the molded body element is preferably "melting point of binder—5"° C. or lower, and more preferably "melting point of binder—10"° C. or lower. Further, when part of or the whole excluding the graft connecting surface of the molded body element is exposed to form the ceramic molded body, the temperature of the molded body element is preferably a temperature of 10° C. or more lower than the melting point of the binder, that is, "melting point of binder—10"° C. or lower, or higher than "melting point of binder—10"° C. and not higher than "melting point of binder—5"° C., in consideration of thermal expansion and deformation of the molded body element. Further, a certain type of binder may increase the possibility of thermal expansion and deformation. Therefore, in some cases, the temperature of the molded body element is preferably "melting point of binder—15"° C. or higher and "melting point of binder—10"° C. or lower. Thus, when the molded body element is previously heated, the temperature is set so as to suit the characteristics such as the softening point of a used binder.

Further, the temperature of the molded body element is preferably increased to 32° C. or higher. In brief, the temperature of the molded body element is preferably increased to the temperature range of 32° C. or higher and "melting point of binder—5"° C. or lower. The molding material for forming the graft molded body element is heated to such a degree that it can be injected into the space within the injection molding mold. For this reason, the binder is liquefied or sufficiently softened. While the graft molded body element is graft molded, heat possessed by the binder of the molding material is transferred to the molded body element. Accordingly, the binder of the molded body element is softened, or the binder on the surface of the molded body element is liquefied. Therefore, adhesive strength is enhanced. Consequently, from the viewpoint of familiarity with the binder of the molding material, heat possessed by the molding material is preferably transferred to the molded body element previously heated to 32° C. or higher, rather than transferred to the molded body element at the temperature close to normal temperature (20° C. to 25° C.). In brief, substantial adhesive strength or tack strength (hereinafter, referred to as "adhesiveness") between the binders, which contributes to connection between the graft connecting surface of the existing molded body element and the newly graft molded graft molded body element, is suitably further enhanced. Further, the connection strength of the graft molded body element to the molded body element can be increased by the increment of the adhesiveness on its graft connecting surface. Accordingly, the connection structure of the connecting surface between the molded body element and the graft molded body element and the connection structure of its end portion are suitably further strengthened.

An example of the method for increasing the temperature of the molded body element described above includes using a heating unit such as hot air, warm air, infrared heaters, and high-frequency induction before disposing the molded body element in an injection molding mold used for graft molding. Alternatively, the molded body element may be disposed in an injection molding mold heated to an appropriate temperature, and thereafter graft molding may be performed when the temperature of the molded body element has reached a predetermined temperature after an appropriate time has elapsed. It is noted that the method and unit for measuring the temperature of the molded body element can be appropriately selected depending on the target temperature, shape, and size of the molded body element, and the surrounding working environment. For example, a surface thermometer may be used, or a temperature sensor placed in an injection molding mold may be used.

Further, the molded body element including part of the outer circumference having a predetermined shape of the ceramic molded body to be formed is preferably used. In brief, in the above-described molded body element forming process, at least part of or the whole of the molded body element is preferably formed so as to include part of the outer circumference having a predetermined shape of the ceramic molded body. In particular, for example, misrun of the molding material is likely to be caused during injection molding in a thin-walled portion of the ceramic molded body such as a pin fin portion of a turbine blade. Therefore, deformation is also likely to be caused after injection molding. Consequently, the molded body element including a shape of part of or the whole of the thin-walled portion is preferably used.

Instead of using the outer circumference of the molded body element as part of the outer circumference of the ceramic molded body, the graft molded body element can be formed around the molded body element by injecting (infusing) the molding material in such a manner to encompass the molded body element (enclosure molding). In the case of enclosure molding, the entire circumference of the molded body element becomes the graft connecting surface. Accordingly, the graft molded body element is connected to the entire circumference of the molded body element by graft molding. When the ceramic molded body to be formed includes a particularly thick-walled portion, air bubbles are likely to be pulled into and remain in the thick-walled portion. Therefore, the use of the above-described enclosure molding facilitates formation of the thick-walled portion of the ceramic molded body. Furthermore, shrinkage attributable to sintering is large in such a thick-walled portion. This tends to cause reduction in shape precision. For this reason, the molded body element formed with another molding material having smaller shrinkage than the molding material used for the graft molded body element is preferably previously enclosed in the thick-walled portion.

In such a structure, the entire surface of the molded body element corresponds to the graft connecting surface. The entire surface of such a molded body element is also formed so as to preferably have a surface roughness of 2 μm or more in terms of Ra. Further, since the connecting surface is large, an appropriate part of the surface of the molded body element may be formed so as to selectively have a surface roughness of 2 μm or more in terms of Ra. In such a case, a portion other than the part of the surface formed so as to have a surface roughness of 2 μm or more in terms of Ra may not be coarsened. This is because from the technological viewpoint of increasing the surface area contributing to connection, the operation and effect of the present invention can be sufficiently achieved by coarsening part of the surface necessary for graft molding.

(Ceramic Sintered Body Forming Process)

In the method of manufacturing the ceramic sintered body according to the present invention, the "forming the ceramic sintered body by degreasing and sintering the ceramic molded body" described above may be considered to be equal to the degreasing process and a sintering process of a ceramic molded body applied in a known injection molding. However, more suitable degreasing and sintering conditions can be preferably found by considering features such as the mechanical strength of the graft connecting portion, and the ceramic powder and the binder constituting the molding material. Examples of the features associated with the ceramic powder include the chemical component, BET specific surface area, formulating ratio, and particle diameter distribution of each powder constituting the ceramic powder. Further, examples of the features associated with the binder and the like include the formulating ratio of the binder in the molding material, the formulating ratios of other additives in the molding material, and the softening temperature, melting point, decomposition temperature, thermal expansion properties, and solubility to various solvents of the binder or the like.

The degreasing process of the ceramic molded body in this ceramic sintered body forming process is preferably divided into two stages of a low temperature degreasing process and a high temperature degreasing process. The low temperature degreasing process means a process from the onset of decomposition of the binder to reaching a predetermined target temperature. The temperature in the high temperature degreasing process is higher than that in the low temperature degreasing process. In this case, the low temperature degreasing process can be continuously followed by the high temperature degreasing process. The high temperature degreasing process can also be continuously followed by the sintering process.

It is noted that in the low temperature degreasing process, the treatment of removing the binder contained in the ceramic molded body is intended. The atmospheric temperature is increased to a target temperature at which the binder is easily decomposed in such a manner that the binder does not ignite at the temperature exceeding the degradation onset temperature of the binder. The target temperature and the temperature increasing rate are controlled in this temperature increasing process or in the process of maintaining the temperature while the temperature is increased or after the target temperature is reached, so that the shape and dimension of the ceramic molded body are maintained in a sound manner. Further, in the high temperature degreasing process, the target atmospheric temperature higher than the temperature of the low temperature degreasing is set within the range that inhibits the ceramic powder from sintering. In this process, the treatment of removing the residual binder from the semi-degreased ceramic molded body is intended in the process of increasing the temperature to its target temperature or in the process of retaining the increased temperature for an optimum period of time after the target temperature has been reached. In brief, according to this method, up to about 80% of the whole content of the binder is removed from the ceramic molded body. Thereafter, the retained binder is removed from the semi-degreased ceramic molded body by, for example, increasing the target temperature and the temperature increasing rate.

In the degreasing process, the binder contained in the ceramic molded body swells as the temperature increases. This binder abruptly starts vaporizing while swelling once the temperature exceeds the decomposition temperature of the binder. For this reason, when the temperature of the ceramic molded body is rapidly increased to the high temperature range exceeding the vaporization temperature of the binder, large deformation of the ceramic molded body is induced. As a result, the possibility that the ceramic molded body including the graft connecting surface is formed into an unexpected unfavorable shape is increased. As a countermeasure to this, the binder is preferably melted by low temperature degreasing in the first stage while suppressing deformation of the ceramic molded body, thereby to obtain the ceramic molded body in a semi-degreased state. Then, the retained binder is vaporized to such a degree that the shape is not collapsed from the semi-degreased state in which voids have increased inside the ceramic molded body, in the high temperature degreasing as the second stage, thereby to obtain the ceramic molded body in a substantially degreased state (a degreased molded body). This two-stage degreasing process is more effective as the size of the ceramic molded body increases.

The method of manufacturing the ceramic sintered body according to the present invention described above is used for casting a turbine blade having a hollow structure. This manufacturing method can be applied as the method of manufacturing a ceramic core having a shape corresponding to the hollow structure of the turbine blade. Further, in this case, at least part of the molded body element is preferably formed so as to have a shape corresponding to the hollow structure of a blade portion of the turbine blade. The blade portion or part of the blade portion of the above-described turbine blade is particularly a thin-walled portion. Therefore, use of one or plurality of molded body elements including part of or the whole of the thin-walled portion eliminates the need for injection of the graft molding material into the thin-walled portion where misrun is likely to be caused during insert molding.

Next, the ceramic sintered body according to the present invention will be described.

Figure 2:
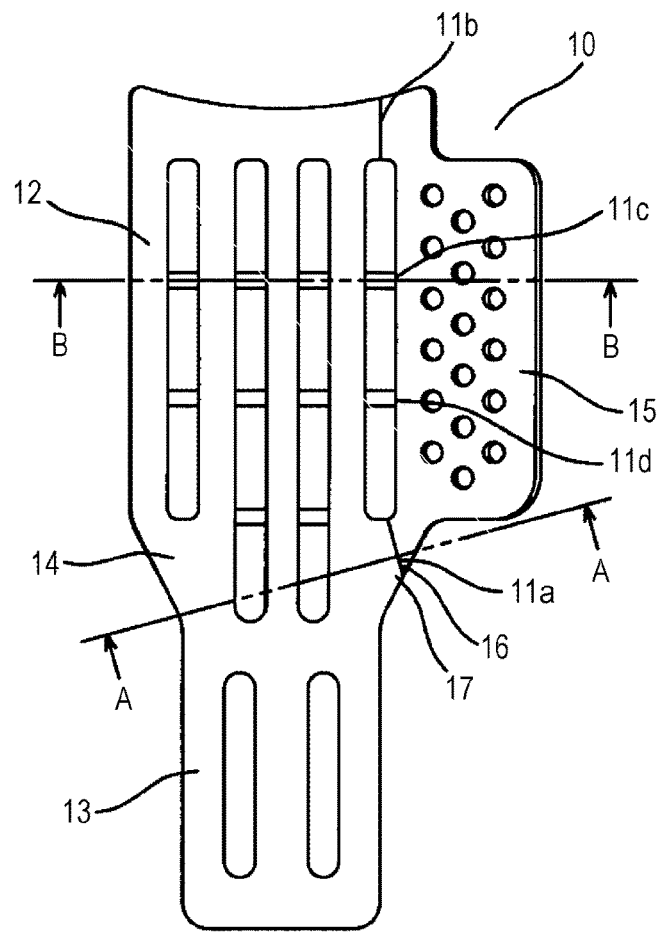
FIG. 2 is a view schematically illustrating an example (an appearance) in which the ceramic core of FIG. 1 is divided into two pieces.

The ceramic sintered body according to the present invention is, as described above, a ceramic sintered body obtained by degreasing and sintering a ceramic molded body including: at least one molded body element formed with a molding material containing a ceramic powder and a binder; and a graft molded body element that is graft molded to the molded body element. An example of the ceramic sintered body includes a ceramic sintered body obtained by degreasing and sintering a ceramic molded body 10 including one pin fin portion core 16 and a body portion core 17 that is graft molded to the pin fin portion core 16, as illustrated in FIG. 2.

An important feature of the present invention is that a forced fracture form of the ceramic sintered body caused by bending at normal temperature (25° C.) is a fracture form that is not attributable to the graft connecting surface between the molded body element and the graft molded body element. Here, the "fracture form that is not attributable to the graft connecting surface" is a fracture form in which the starting point of breaking or cracking in the degreased ceramic molded body (degreased molded body) and ceramic sintered body is neither the graft connecting surface between the molded body element and the graft molded body element nor the end portion of the graft connecting surface. The fracture form is intended to be a case where the graft connecting surface does not independently act on the fracture, such as when the graft connecting surface is not exposed at all or is only partly exposed on the fracture surface, and therefore it is understood that the graft connecting surface is not a main cause of the fracture.

The ceramic sintered body causing such a "fracture form that is not attributable to the graft connecting surface" can be formed by the method of manufacturing the ceramic sintered body according to the present invention described above, in which the graft connecting surface of the molded body element is formed so as to have a surface roughness of 2 μm or more in terms of Ra. The ceramic sintered body according to the present invention prepared by this method can suppress preferential fracture from the graft connecting surface which is attributable to a poor connection of the graft connecting surface inherently existing in the stage of the ceramic molded body. Furthermore, in the ceramic sintered body prepared by additionally increasing the temperature of the molded body element to "melting point of binder—5"° C. or lower before the graft molded body element is graft molded, preferential fracture from the graft connecting surface is further suppressed. In this manner, a cast produced by using, as a core, the ceramic sintered body according to the present invention can suppress the occurrence of convex-like defects (penetrations) caused by breaking and cracking of the core attributable to the graft connecting surface. Therefore, the ceramic sintered body according to the present invention can be used as a core having a complex shape and requiring high dimensional accuracy for forming a hollow structure such as cooling holes disposed to a turbine blade of a gas turbine. Thus, there can be obtained a cast such as a gas turbine blade having a sound hollow structure.

EXAMPLES

In order to confirm the operation and effect of the method of manufacturing a ceramic sintered body and the ceramic sintered body according to the present invention, there was prepared the ceramic molded body 10 including the pin fin portion core 16 as the molded body element and the body portion core 17 as the graft molded body element and obtained by connecting two pieces illustrated in FIG. 2 by graft molding. Thereafter, the prepared molded body was degreased and sintered, and as necessary subjected to finish processing, to obtain the ceramic core 1 (a ceramic sintered body) illustrated in FIG. 1.

Hereinafter, the present invention will be specifically described. The scope of the present invention is not limited to the present invention examples described herein.
(Molded Body Element and Graft Molded Body Element)

The ceramic molded body 10 was divided into two pieces along a connecting portion 11 (connecting surfaces 11a, 11b, 11c, and 11d). As one molded body element to be previously formed, there was formed the pin fin portion core 16 including a pin fin portion 15 of a blade portion 12. Further, as a graft molded body element to be connected to the pin fin portion core 16 by graft molding, there was formed the body portion core 17 excluding the pin fin portion core 16, that is, a residual portion containing the blade portion 12 excluding the pin fin portion 15, a dovetail portion 13, and a platform portion 14.
(Molding Material)

A substantially same molding material was used in the pin fin portion core 16 and the body portion core 17 for clarification of the operation and effect of the present invention. However, a different molding material may be used. A prepared molding material is an injection molding composition including: 68% by volume of a ceramic powder; 32% by volume of a binder containing a paraffin wax and a styrene-based thermoplastic elastomer (the melting point of the binder was about 50° C.). This composition was prepared by sufficiently mixing the material using a mixing stirrer. The ceramic powder is a mixed powder obtained by mixing: 1 mol % (1.5% by mass) of alumina powder ($Al_2O_3$); 7 mol % (18.6% by mass) of zircon powder ($ZrSiO_4$) and as a remainder, fused silica powder ($SiO_2$), and potassium hydroxide and sodium hydroxide for adjusting a total amount of a potassium content and a sodium content to be 0.1% by mass or less. The grain structure of this mixed powder according to the integrated volume particle size distribution curve of the grain contains coarse powder having a particle diameter of more than 50 μm with a cumulative percentage of 19%, fine powder having a particle diameter of 5 μm or less with a cumulative percentage of 28%, and submicron powder having a particle diameter of 1 μm or less with a cumulative percentage of less than 2%.
(Molded Body Element Forming Process)

Figure 3:
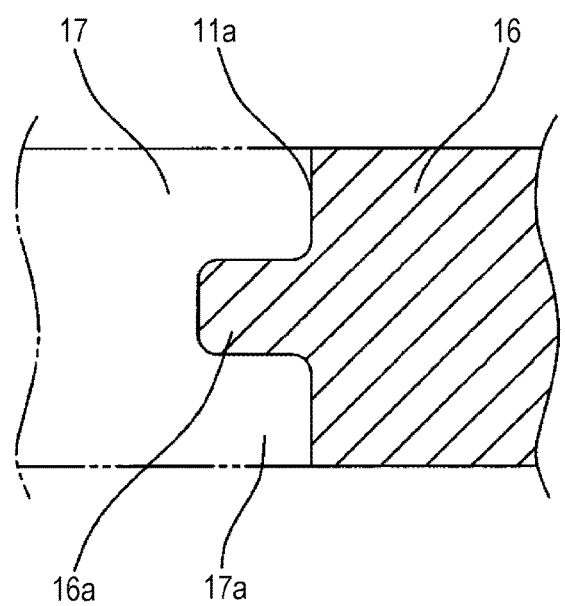
FIG. 3 is a view schematically illustrating a vicinity of a connecting surface 11a of a pin fin portion core 16 in a cross section of a location indicated by line segment AA in FIG. 2.
Figure 4:
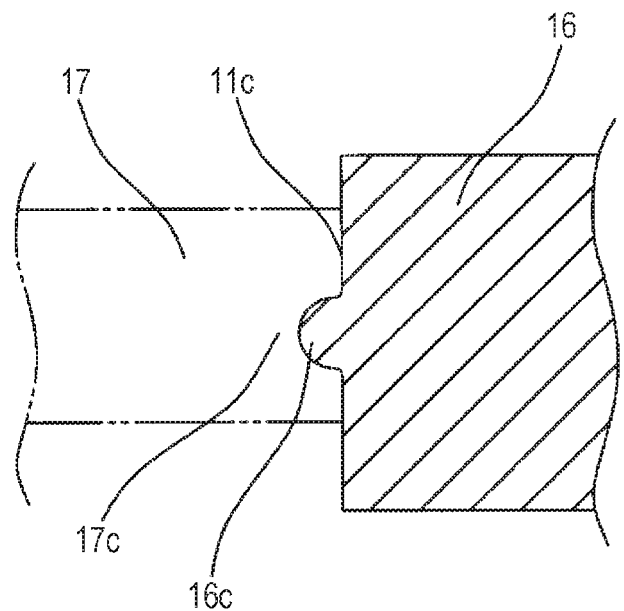
FIG. 4 is a view schematically illustrating a vicinity of a connecting surface 11c of a pin fin portion core 16 in a cross section of a location indicated by line segment BB AA in FIG. 2.
Figure 5:
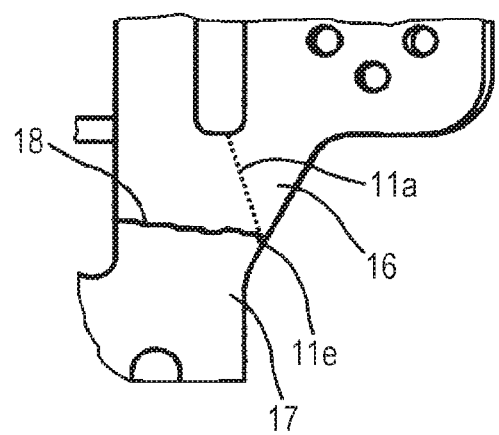
FIG. 5 is a view schematically illustrating an example of breaking which was caused in a ceramic molded body (a degreased body) obtained by applying an existing insert molding process (Patent Literature 1).

Since the binder was liquefied by increasing the temperature to about 70° C., the pin fin portion core 16 (molded body element) was produced by injecting (infusing), with a pressure of about 7 MPa, a molding material having fluidity into a mold for injection molding including a cavity corresponding to the shape of the pin fin portion core 16 at normal temperature, and thereafter allowing the injected molding material to stand in the mold for solidification. At this time, a tongue-like convex portion 16a indicated by hatched lines in FIG. 3 was formed on the connecting surface 11a of the pin fin portion core 16 to be connected with the body portion core 17. Similarly, a convex portion (not illustrated) having the same form as the convex portion 16a was formed on the connecting surface 11b. Further, a hemispherical convex portion 16c indicated in hatched lines in FIG. 4 was formed on the connecting surface 11c. Similarly, a convex portion 16d (not illustrated) having the same form as the convex portion 16c was formed on the connecting surface 11d. The pin fin portion core 16 obtained as described above had been formed so as to have a shape and surface roughness (1.0 μm to 1.2 μm in terms of Ra) corresponding to its cavity surface.
(Case A)

Some pin fin portion cores 16 were optionally selected from the produced pin fin portion cores 16. The connecting surface 11a including the convex portion 16a as the graft connecting surface, the connecting surface 11b including the convex portion in the same form as the convex portion 16a, and the connecting surfaces 11c and 11d of each of the selected pin fin portion cores 16 were ground to be coarsened, and then subjected to graft molding. Present invention examples Nos. 1 to 4 indicated in Table 1 correspond to this.
(Case B)

Some pin fin portion cores 16 were optionally selected from the pin fin portion cores 16 of present invention example No. 1 indicated in Table 1. The temperature of the pin fin portion cores 16 was increased to a predetermined temperature before graft molding, and thereafter graft molding was performed. Present invention examples Nos. 5 and 6 indicated in Table 1 correspond to this.
(Case C)

Some pin fin portion cores 16 were optionally selected from the produced pin fin portion cores 16. Using these pin fin portion cores 16, graft molding was performed without grinding the connecting portion 11 and without increasing the temperature before the graft molding. Comparative examples Nos. 1 and 2 indicated in Table 1 correspond to this.
(Case D)

Some pin fin portion cores 16 were optionally selected from the produced pin fin portion cores 16. The temperature of the pin fin portion cores 16 was increased to a predetermined temperature before graft molding without grinding the connecting portion 11, and thereafter graft molding was performed. Comparative example No. 3 indicated in Table 1 corresponds to this.

(Ceramic Molded Body Forming Process)

The ceramic molded body 10 was prepared by injecting (infusing), with a pressure of about 7 MPa, a molding material at about 70° C. having suitable fluidity into an injection molding mold including a cavity surface corresponding to the shape of the ceramic molded body 10 and having been increased in temperature to normal temperature or 40° C., and thereafter leaving the molding material to stand in the mold for solidification. At this time, the surface roughness of the cavity surface was set so as to become equal to the surface roughness of the cavity surface of the mold used in the molded body element forming process. The pin fin portion core 16 placed in the cavity remained at normal temperature in Cases A and C. In Cases B and D, the temperature of the pin fin portion core 16 was increased to the predetermined temperatures indicated in Table 1 before injecting the molding material. It is noted that the temperature of the pin fin portion core 16 in the mold was measured immediately before clamping using a common surface thermometer.

Specifically, the pin fin portion core 16 of each of present invention examples Nos. 1 to 4 and comparative examples 1 and 2 indicated in Table 1 was sufficiently exposed to normal temperature environment, and thereafter was disposed in a mold at normal temperature. The pin fin portion core 16 of present invention example No. 5 was disposed in a mold having been increased in temperature to 40° C., and thereafter was sufficiently retained. This increased the temperature of the pin fin portion core 16 of present invention example No. 5. The pin fin portion core 16 of each of present invention example No. 6 and comparative example No. 3 was previously heated with an infrared heater. After the temperature was increased in this manner, each of these pin fin portion cores 16 was disposed in a mold at normal temperature.

The body portion core 17 (graft molded body element) was graft molded to the previously formed pin fin portion core 16 (molded body element), so that the ceramic molded body 10 was obtained. At this time, in the connecting portion 11 of the pin fin portion core 16, graft connection had been achieved in such a form that concave portions 17a, 17c, and 17d of the body portion core 17 mate with the convex portions 16a, 16c, and 16d respectively, and concave portion on the connecting surface 11b of the body portion core 17 mates with the convex portion on the connecting surface 11b. Each of the ceramic molded bodies 10 produced in this manner had a shape and surface roughness corresponding to the cavity surface of the mold.

The treatment condition and the surface roughness of the graft connecting surface (connecting portion 11) of the pin fin portion core 16 as well as the temperature of the pin fin portion core 16 and the temperature of the injection molding mold (graft molding mold) during graft molding are indicated in Table 1. The surface roughness is an average value obtained by measuring a plurality of locations of the connecting surfaces 11a, 11b, 11c, and 11d by moving a stylus in the directions indicated in roughness measurement directions using a commonly used stylus-type digital surface roughness tester. It is noted that Ra indicates arithmetic average roughness, Rz indicates maximum height roughness, and $R_{ZJIS}$ indicates ten-point average roughness. These are in accordance with JIS-B0601:2013.

TABLE 1

| | | | | | | | | | | Temperature during graft molding (° C.) | Temperature during graft molding (° C.) | Temperature during graft molding (° C.) |
|---|---|---|---|---|---|---|---|---|---|---|---|---|
| | | | Pin fin portion core | | | | | | | | | |
| | | | Treatment of graft connecting surface | | | | | | | | | |
| Classification | | No | Case | Abrasive | Count | Roughness measurement direction | Ra (μm) | Rz (μm) | Rzjis (μm) | | | |
| Present invention examples | | 1 | A | Sponge | #80 | Substantially parallel to grinding direction | 2.7 | 15.1 | 10.8 | 25 | Normal temperature | 70 |
| | | 2 | A | Sponge | #80 | Substantially orthogonal to grinding direction | 5.4 | 35.1 | 22.6 | 25 | Normal temperature | 70 |
| | | 3 | A | Sponge | #120 to #180 | Substantially parallel to grinding direction | 3.5 | 22.8 | 14.0 | 25 | Normal temperature | 70 |
| | | 4 | A | Sponge | #120 to #180 | Substantially orthogonal to grinding direction | 4.6 | 26.1 | 19.3 | 25 | Normal temperature | 70 |
| | | 5 | B | Sponge | #80 | Substantially parallel to grinding direction | 2.7 | 15.1 | 10.8 | 35 | 40 | 70 |
| | | 6 | B | Sponge | #80 | Substantially parallel to grinding direction | 2.7 | 15.1 | 10.8 | 43 | Normal temperature | 70 |
| Comparative examples | | 3 | C | Not ground | | Substantially parallel to grinding direction | 1.0 | 8.8 | 5.6 | 25 | Normal temperature | 70 |
| | | 2 | C | Not ground | | Substantially orthogonal to grinding direction | 1.2 | 9.7 | 6.0 | 25 | Normal temperature | 70 |
| | | 3 | C | Not ground | | Substantially parallel to grinding direction | 1.2 | 9.7 | 6.0 | 30 | Normal temperature | 70 |

(Ceramic Sintered Body Forming Process)

Each of the ceramic molded bodies 10 produced as described above was degreased and sintered to produce a ceramic sintered body.

Specifically, in the first stage of the degreasing and sintering process, low temperature degreasing was performed at a target temperature of 240° C. such that the removal amount of the binder contained in the ceramic molded body 10 falls within 80% to 90% in terms of a mass ratio between before and after the low temperature degreasing. In the second stage, high temperature degreasing was performed by maintaining the temperature of the semi-degreased molded body after the low temperature degreasing at a defined temperature of 400° C. for 2 h. Thereafter, a defined temperature of 1300° C. was maintained for 2 h thereby to sinter the ceramic powder. In this manner, there were prepared ceramic sintered bodies each having a relative density (sintered density) of 68% to 72%, which correspond to present invention examples and comparative examples. Although each of the ceramic sintered bodies produced in this manner includes the graft connecting surface, this ceramic sintered body has an appearance equal to the ceramic core 1 illustrated in FIG. 1 and can be used as a ceramic core.

(Cracking and Breaking)

The pin fin portion core 16 before graft molding, the ceramic molded body 10 after graft molding, the degreased molded body after degreasing, and the finally produced ceramic sintered body (the ceramic core 1) were checked for presence or absence of cracking and breaking. Observable whole surfaces were observed visually or with magnifying glasses. Furthermore, presence or absence of a poor connection was checked by applying to a test object a slight load to a degree that does not normally lead to fracture. The result is illustrated in Table 2.

TABLE 2

| Classification | No | Case | Breaking and cracking | | Breaking, cracking and poor connection | |
|---|---|---|---|---|---|---|
| | | | Pin fin portion core before graft molding | Ceramic molded body after graft molding | After degreasing (Degreased molded body) | Ceramic sintered body |
| Present invention examples | 1 | A | None | None | None | None |
| | 2 | A | None | None | None | None |
| | 3 | A | None | None | None | None |
| | 4 | A | None | None | None | None |
| | 5 | B | None | None | None | None |
| | 6 | B | None | None | None | None |
| Comparative examples | 1 | C | None | (Not confirmed) | Cracking | Breaking |
| | 2 | C | None | Poor connection | (Not confirmed) | Cracking |
| | 3 | D | None | Poor connection | (Not confirmed) | Cracking |

Figure 6:
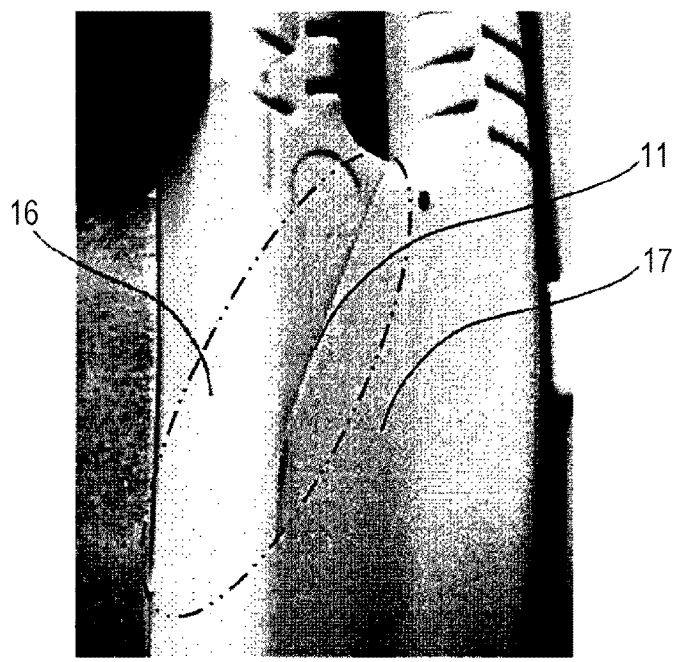
FIG. 6 is views illustrating a vicinity of a connecting portion of a ceramic molded body and a vicinity of a connecting portion of a degreased molded body according to present invention example No. 1.
Figure 6:
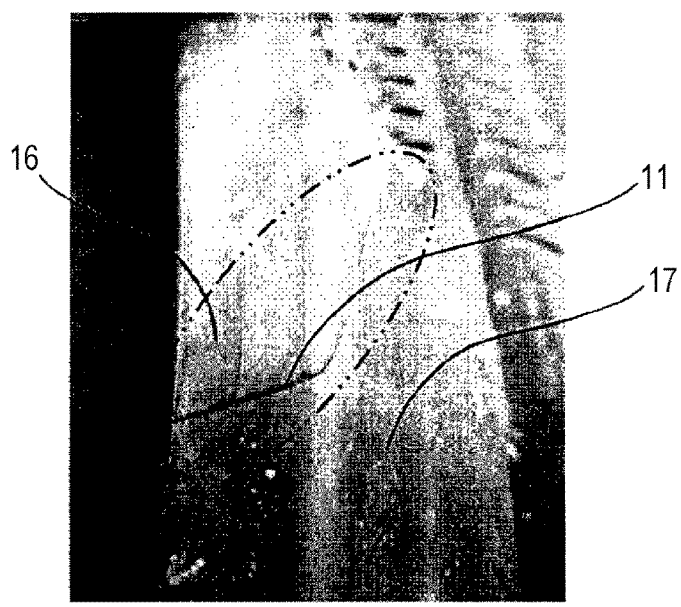

Breaking, cracking or a poor connection had not been caused in each stage from the pin fin portion core to the ceramic sintered body of the present invention examples. As an example, the vicinity of the connecting portion 11 (the connecting surface 11a) of the ceramic molded body after graft molding according to present invention example No. 1 is illustrated in FIG. 6(a). Furthermore, the vicinity of the connecting portion 11 (the connecting surface 11a) of the degreased molded body after high temperature decreasing according to present invention example No. 1 is illustrated in FIG. 6(b). In FIG. 6(a), the connecting portion 11 appears a linear mark within an enclosure drawn in a double-dashed line. Further, in FIG. 6(b), the connecting portion 11 appears a partly somewhat grooved linear mark within an enclosure drawn in a double-dashed line. This connecting portion 11 appearing in FIG. 6(b) is not cracking. Therefore, even if this is formed as a ceramic core and used for casting, convex-like defects (penetrations) are not caused in the hollow structure of the cast.

Figure 7:
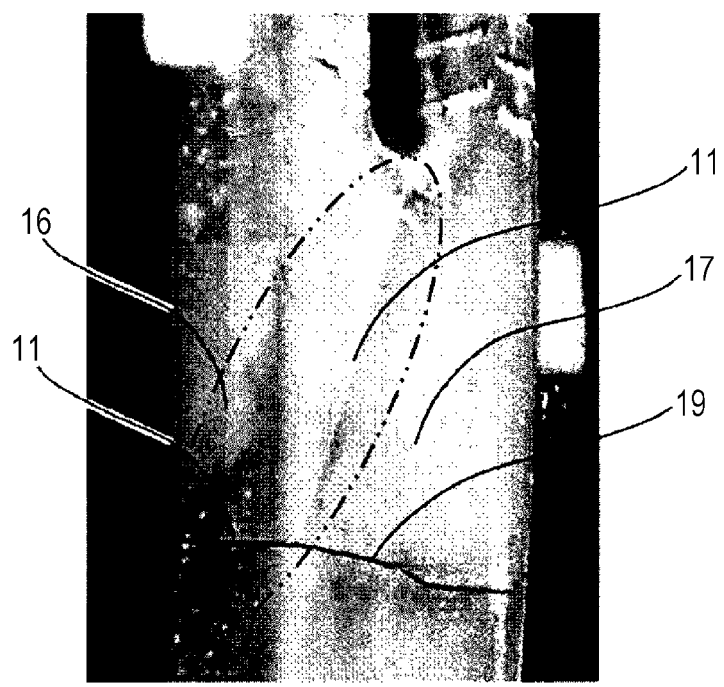
FIG. 7 is a view illustrating a vicinity of a connecting portion of a degreased decreased molded body according to comparative example No. 1.

In the degreased molded body after high temperature decreasing according to comparative example No. 1, as appearing within an enclosure drawn in a double-dashed line in FIG. 7, cracking 19 which is nearly breaking and extends from the connecting portion 11 (the connecting surface 11a) had been caused. This cracking 19 had been also caused in pan of the connecting portion 11 (the left hand portion of the cracking 19 in FIG. 7). This cracking led to breaking after subsequently performed sintering. Therefore, the degreased molded body having such cracking 19 cannot be used as a ceramic core.

Figure 8:
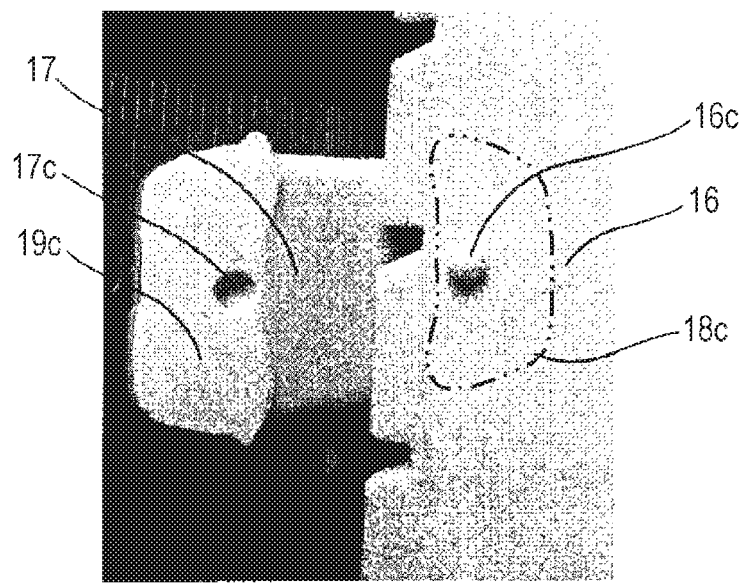
FIG. 8 is views illustrating a vicinity of a fractured connecting portion of a ceramic molded body according to comparative example No. 2.
Figure 8:
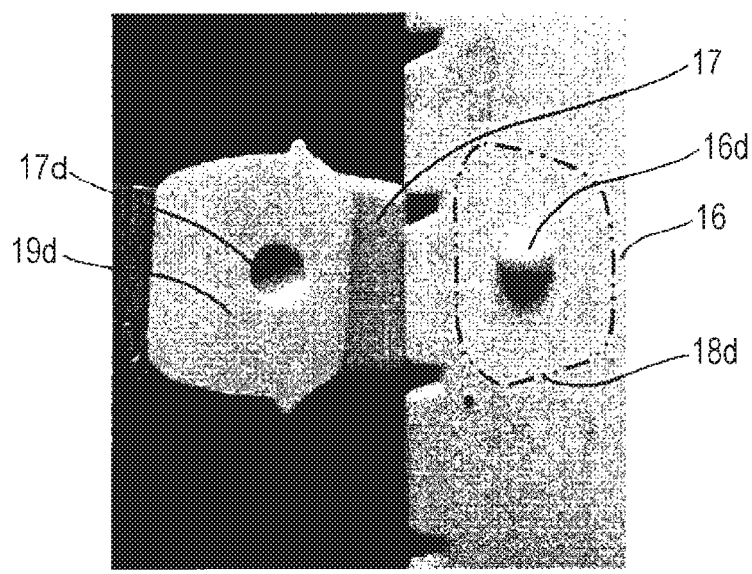

In the ceramic molded body according to comparative example No. 2, a poor connection, which was substantially failure of connection (failure of adhesion), had been caused as illustrated in FIG. 8. The vicinity of the fractured connecting surface 11c of the ceramic molded body according to comparative example No. 2 is illustrated in FIG. 8(a). Furthermore, the vicinity of the fractured connecting surface 11d of the ceramic molded body according to comparative example No. 2 is illustrated in FIG. 8(b). Connection boundaries 18c and 18d by graft molding exist near the areas indicated by double-dashed lines in FIG. 8. It is understood that there is serious failure of connection (failure of adhesion) to a degree that disables determination of fracture marks in the vicinities of the connection boundaries 18c and 18d. This demonstrated that in the case of comparative example No. 2, there is failure of connection (failure of adhesion) in the whole region on the connecting surfaces 11c and 11d between the pin fin portion core 16 and the body portion core 17. It is noted that this poor connection led to cracking after subsequently performed degreasing and sintering. When a ceramic core formed from this is used for casting, the cracking exposed to high temperature during casting is likely to lead to breaking. As a result, convex-like defects (penetrations) are likely to be caused in the hollow structure of the cast. Therefore, such a ceramic core which is likely to lead to such breaking is usually dealt with as a defective product. Thus, such a ceramic core is not used for casting.

Figure 9:
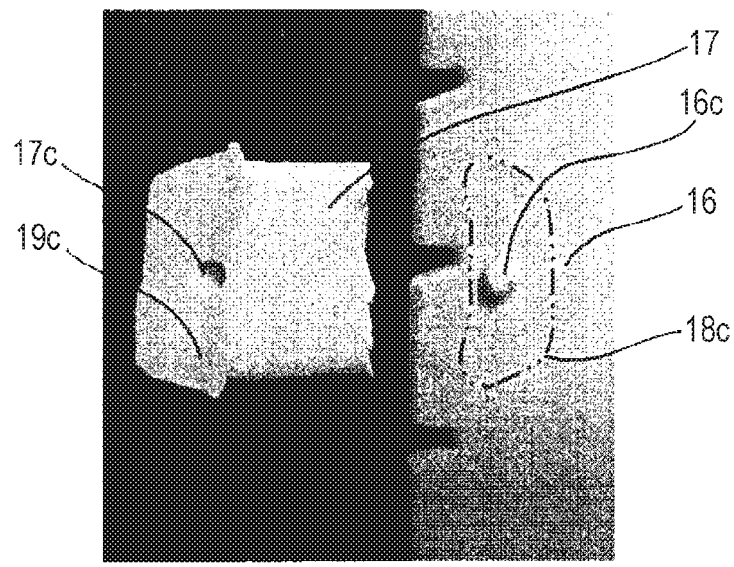
FIG. 9 is views illustrating a vicinity of a fractured connecting portion of a ceramic sintered body according to comparative example No. 3.
Figure 9:
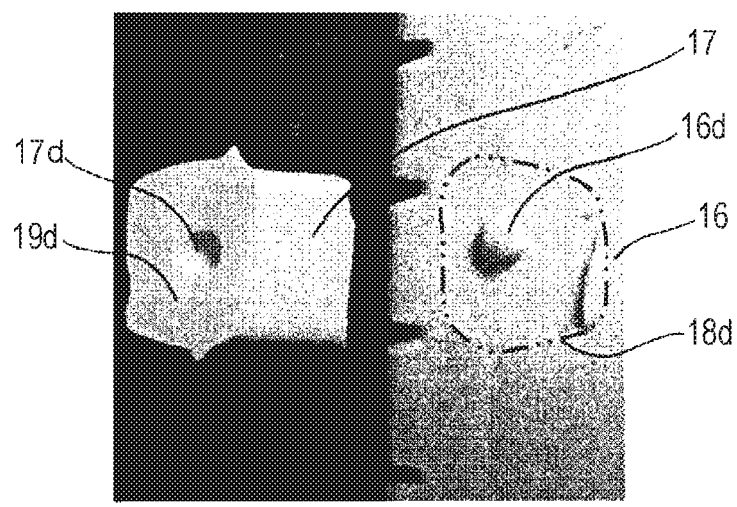

In the ceramic molded body according to comparative example No. 3, a poor connection, which was substantially failure of connection (failure of adhesion), had been caused as illustrated in FIG. 9. The vicinity of the fractured connecting surface 11c of the ceramic molded body according to comparative example No. 3 is illustrated in FIG. 9(a). Furthermore, the vicinity of the fractured connecting surface 11d of the ceramic molded body according to comparative example No. 3 is illustrated in FIG. 9(b). Connection boundaries 18c and 18d by graft molding exist near the areas indicated by double-dashed lines in FIG. 9. It is understood that in the connecting surface 11c having a smaller connection area than the connecting surface 11d, there is a serious failure in connection (failure of adhesion) to a degree that disables determination of a fracture mark, in the vicinity of the connection boundary 18c. Further, in the connecting surface 11d, a connection mark can be determined in part of the vicinity of the connection boundary 18d. However, it is understood that failure of connection (failure of adhesion) is caused in most of the region. It is noted that this poor connection led to cracking after subsequently performed degreasing and sintering.

(Forced Fracture Form of Ceramic Sintered Body)

Figure 10:
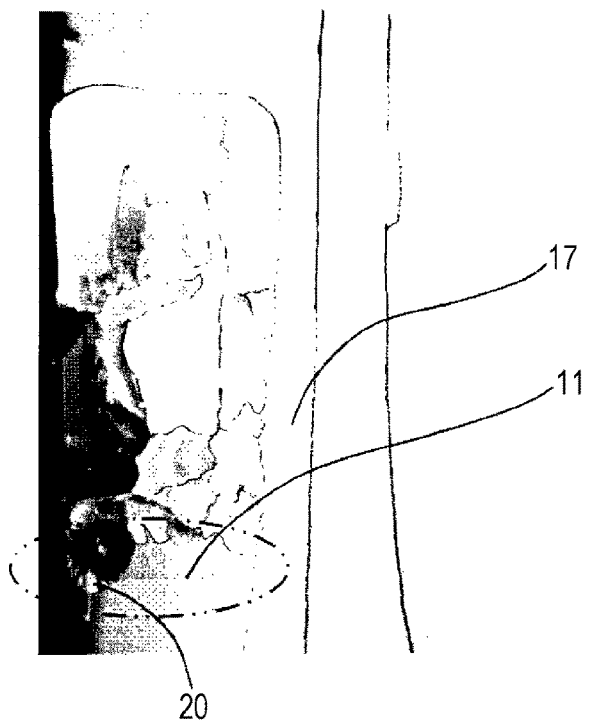
FIG. 10 is a view illustrating an example of a forced fracture form of a ceramic sintered body according to present invention example No. 1.

The ceramic sintered bodies according to present invention examples Nos. 1 to 4 and comparative example No. 2 were subjected to a bending load thereby to be forcibly fractured. The bending load was applied in the vicinity of the connecting portion 11 (particularly, the connecting surface 11a) as the graft connecting surface at normal temperature (25° C.) so as to cause fracture. The forced fracture forms were observed visually or with magnifying glasses. As an example, the fracture portion of the ceramic sintered body according to present invention example No. 1 is illustrated in FIG. 10. Furthermore, the fracture portion of the ceramic sintered body according to comparative example No. 2 is illustrated in FIG. 11.

In the ceramic sintered body (the body portion core 17 side) according to present invention example No. 1 illustrated in FIG. 10, it can be visually recognized that the connecting portion 11 remains like a linear mark within an enclosure drawn in a double-dashed line. Further, in a fracture surface 20 including the connecting portion 11, exposure of the connecting surface 11a could not be visually recognized. Furthermore, a fracture form that stretches across the connecting portion 11 could be visually recognized. Further, a planar fracture portion appearing on the upper side in FIG. 10 is not exposure of the connecting surface 11a. This is fracture on the near side (the pin fin portion core 16 side) of the connecting surface 11a. It is understood that this is a fracture form that is not substantially attributable to the graft connecting surface. Therefore, the forced fracture form by bending at normal temperature (25° C.) of present invention example No. 1 is a fracture form that is not substantially attributable to the graft connecting surface. That is, it could be confirmed that the connection strength by graft molding between the pin fin portion core 16 as the molded body element and the body portion core 17 as the graft molded body element is high.

Figure 11:
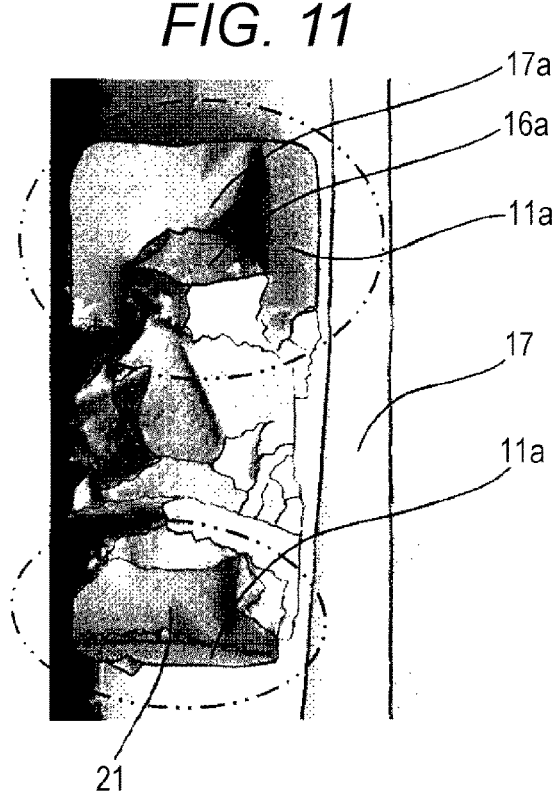
FIG. 11 is a view illustrating an example of a forced fracture form of a ceramic sintered body according to comparative example No. 2.

In the ceramic sintered body (the body portion core 17 side) according to comparative example No. 2 illustrated in FIG. 11, the connecting portion 11 can be visually recognized as a graft connecting surface that is exposed within two enclosures drawn in double-dashed lines. In FIG. 11, only one portion that was fractured on the near side (the pin fin portion core 16 side) of the connecting surface 11a can be visually recognized between the two enclosures drawn in double-dashed lines. However, although chipping appears in part of the near side in a fracture surface 21 on the lower side, the substantially smooth, planar connecting surface 11a can be visually recognized. Further, in a fracture portion on the upper side, the graft connecting surface can be visually recognized between the convex portion 16a of the pin fin portion core 16 and the concave portion 17a of the body portion core 17. Furthermore, there can be visually recognized the planar connecting surface 11a that is substantially smooth both on the left and right sides. Therefore, it could be confirmed that the forced fracture form by bending at normal temperature (25° C.) of the ceramic sintered body according to comparative example No. 2, in which a large portion of the connecting surface 11a as the graft connecting surface is exposed, is a fracture form that is attributable to the graft connecting surface. That is, it could be confirmed that the connection strength by graft molding between the pin fin portion core 16 as the molded body element and the body portion core 17 as the graft molded body element is low.

(Forced Fracture Form of Ceramic Molded Body)

Figure 12:
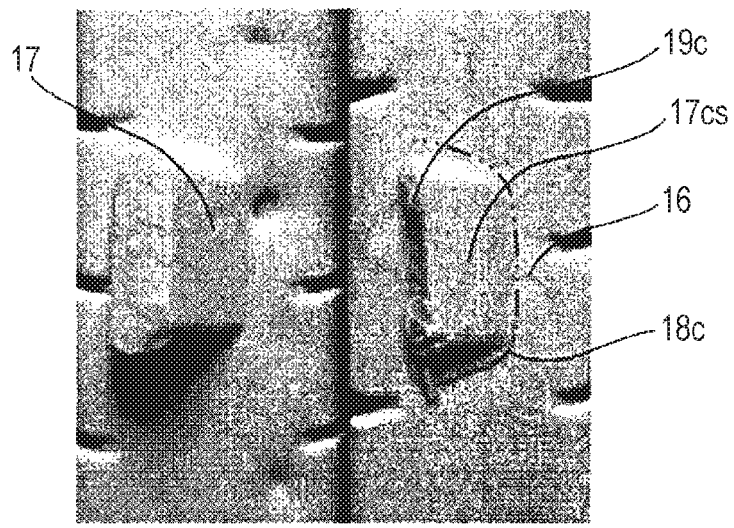
FIG. 12 is views illustrating a vicinity of a fractured connecting portion of a ceramic molded body according to present invention example No. 5.
Figure 12:
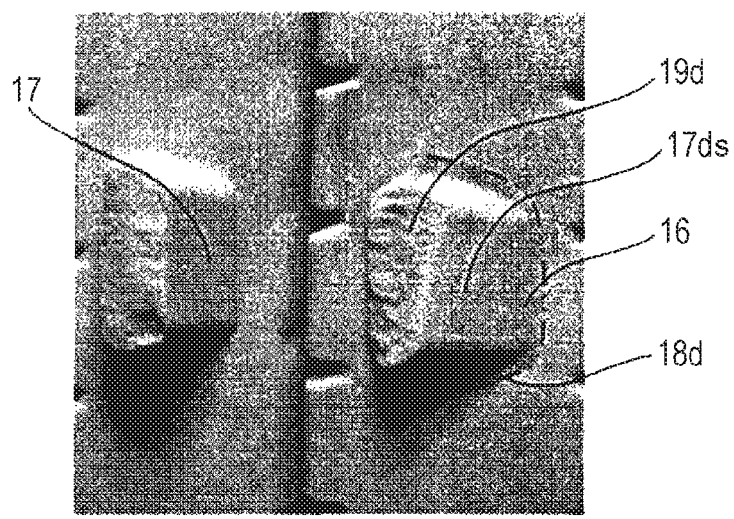

The ceramic molded bodies according to present invention examples Nos. 5 and 6 were subjected to a bending load thereby to be forcibly fractured. The bending load was applied in the vicinity of the connecting portion 11 (particularly, the connecting surface 11a) as the graft connecting surface at normal temperature (25° C.) so as to cause fracture. The forced fracture forms were observed visually or with magnifying glasses. As an example, a fracture portion in the vicinity of the connecting surface 11c of the ceramic molded body according to present invention example No. 5 is illustrated in FIG. 12(a). Furthermore, a fracture portion in the vicinity of the connecting surface 11d of the ceramic molded body according to present invention example No. 5 is illustrated in FIG. 12(b). Connection boundaries 18c and 18d by graft molding exist near the areas indicated by double-dashed lines in FIG. 12. Here, it was confirmed that the ceramic molded body according to present invention example No. 6 is similar to present invention example No. 5. Therefore, the illustration and description will be omitted.

In the vicinities of connection boundaries 18c and 18d of the ceramic molded body according to present invention example No. 5 illustrated in FIG. 12(a) and FIG. 12(b), there was not observed a poor connection attributable to the connecting surface 11, such as spacing, cracking, breaking and peeling. Further, fracture had been caused at a location having a small cross-sectional area on the body portion core 17 side. For this reason, exposure of the graft connecting surface could not be confirmed at all in fracture surfaces 19c and 19d. In this forced fracture form, part of the body portion core 17 side had remained as fracture remainders 17cs and 17ds in a state of being connected to the pin fin portion core 16 side. Therefore, it could be confirmed that the forced fracture form by bending at normal temperature (25° C.) of the ceramic molded body according to present invention example No. 5 is a fracture form that is not attributable to the graft connecting surface. That is, it could be confirmed that the connection strength by graft molding between the pin fin portion core 16 as the molded body element and the body portion core 17 as the graft molded body element is high.

As described above, the problem related to breaking and cracking starting from the connecting surface and the problem related to poor connections that are considered to be attributable to failure of connection of the connecting surface associated with the known insert molding could be solved by the method of manufacturing the ceramic sintered body according to the present invention including forming the graft connecting surface of the molded body element so as to have a surface roughness of 2 μm or more in terms of Ra.

Accordingly, there was obtained a ceramic sintered body that is useful as a ceramic core used for manufacturing a cast having a hollow structure such as a turbine blade. The forced fracture form by bending at normal temperature (25° C.) of the ceramic sintered body becomes a fracture form that is not attributable to the graft connecting surface between the molded body element and the graft molded body element.

Consequently, for example, when producing a cast having a complex hollow structure such as a turbine blade having cooling holes inside the turbine blade, occurrence of convex-like defects attributable to breaking and cracking of the ceramic core and the like can be suppressed.

LIST OF NUMERAL REFERENCES

1. Ceramic core, 2. Blade portion, 3. Dovetail portion, 4. Platform portion, 5. Pin fin portion, 10. Ceramic molded body, 11. Connecting portion, 11*a*. Connecting surface, 11*b*. Connecting surface, 11*c*. Connecting surface, 11*d*. Connecting surface, 11*e*. End portion, 12. Blade portion, 13. Dovetail portion, 14. Platform portion, 15. Pin fin portion, 16. Pin fin portion core, 16*a*. Convex portion, 16*c*. Convex portion, 17. Body portion core, 17*a*. Concave portion, 17*c*. Concave portion, 17*cs*. Fracture remainder, 17*ds*. Fracture remainder, 18. Breaking, 18*c*. Connection boundary, 18*d*. Connection boundary, 19. Cracking, 19*c*. Fracture surface, 19*d*. Fracture surface, 20. Fracture surface, 21. Fracture surface

The invention claimed is:

1. A method of manufacturing a ceramic sintered body, comprising:
    forming a molded body element with a molding material containing a ceramic powder and a binder;
    forming a ceramic molded body by disposing the molded body element in an injection molding mold and then injecting a molding material containing a ceramic powder and a binder into a space within the injection molding mold and graft molding a graft molded body element to the molded body element; and
    forming the ceramic sintered body by degreasing and sintering the ceramic molded body, wherein
    a graft connecting surface of the molded body element to which the graft molded body element is graft molded is formed so as to have a surface roughness of 2 μm or more in terms of Ra, and
    the molded body element is previously increased in temperature to 5° C. or more lower than a melting point of the binder contained in the molded body element before the graft molded body element is graft molded.

2. The method of manufacturing the ceramic sintered body according to claim 1, wherein the molded body element is previously increased in temperature to 32° C. or higher.

3. The method of manufacturing the ceramic sintered body according to claim 1, applied to a method of manufacturing a ceramic core which is used for casting a turbine blade having a hollow structure and has a shape corresponding to the hollow structure of the turbine blade.

4. The method of manufacturing the ceramic sintered body according to claim 3, wherein at least part of the molded body element is formed into a shape corresponding to the hollow structure of a blade portion of the turbine blade.

* * * * *